Oct. 7, 1969    R. W. CANNON    3,470,851
INCUBATOR EGG TRAY

Filed Nov. 21, 1967    2 Sheets-Sheet 1

INVENTOR.
ROBERT W. CANNON,
BY *Kimmel Crowell & Weaver*

Oct. 7, 1969　　　　　R. W. CANNON　　　　　3,470,851
INCUBATOR EGG TRAY

Filed Nov. 21, 1967　　　　　　　　　　　　　　2 Sheets-Sheet 2

INVENTOR.
ROBERT W. CANNON,
BY Kimmel Crowell & Weaver.

ATTORNEYS.

United States Patent Office 3,470,851
Patented Oct. 7, 1969

3,470,851
INCUBATOR EGG TRAY
Robert W. Cannon, 6565 Joseph SE.,
Salem, Oreg. 97301
Filed Nov. 21, 1967, Ser. No. 684,742
Int. Cl. A01k *41/00*
U.S. Cl. 119—43           7 Claims

ABSTRACT OF THE DISCLOSURE

An egg tray made of polypropylene consisting of support beams forming rectangular openings, fingers extending into the openings for resiliently supporting eggs, support spiles for supporting a plurality of trays in vertically spaced relation and a plurality of engaging spiles for holding an egg in a predetermined confined space in the tray, the trays being of open work construction to permit free circulation of air throughout a plurality of stacked trays and about the eggs therein is disclosed.

BACKGROUND OF THE INVENTION

Field of the invention

The present invention relates to egg supporting trays and more particularly to egg trays utilized during the incubation of chicken and turkey eggs.

Description of the prior art

Incubation racks and trays, generally, are well known in the prior art. For example, United States Patent No. 2,287,906, Root, describes an incubation rack with means for circulating air about eggs. United States Patent No. 1,300,957, Harrison, describes an incubator tray which is rather complicated in structure but provides for securing an egg between foraminous members to permit circulation of air. United States Patents No. 2,926,809, Studler, and No. 3,147,738, Theilig, both described egg racks designed for holding eggs during incubation. The Studler patent provides a plurality of generally planar members which are cut to secure the eggs in particular positions. Egg racks of this type are generally successful for the primary purpose of holding the eggs in the desired position; however, because of the construction of the racks only limited circulation of air about the eggs is permitted and circulation is permitted only in certain planes or in certain directions. The Theilig egg tray, similarly, adequately supports the eggs but, while it permits more free circulation of the air than the Studler invention, the rack, because of the planar construction of the supporting frame and of the egg retaining means tends to limit the circulation of air about eggs during incubation.

A large number of trays and racks for particular purposes, primarily for storage and transit, are known in the prior art. Benedict, for example, disclosed an egg preserving rack in United States Patent No. 1,587,499. Storage and shipment rack include holders of the type described in United States Patent No. 999,054, Mrksity; Patent No. 586,846, Hammer; No. 1,153,495, Jones; No. 1,553,197, Bookman; and No. 1,449,531 Moore. All of these racks have the common feature that the construction is such that free circulation around the eggs is not permitted. During ordinary transit and storage, it is, of course, not necessary to provide for circulation of air around eggs. This is particularly true where the eggs are carried or stored in refrigerated compartments.

It is well known that during incubation the eggs develop a significant amount of heat due to the incubation process. The amount of heat generated at any given time is related to the state of the incubation process. That is, the eggs give off a greater amount of heat during later stages of the incubation than during the very early stages of incubation. It is also known that in order to produce viable poults the temperature of the eggs must be very closely controlled. The temperature control must, of course, take into consideration the amount of heat being generated during the incubation process by the eggs. It is common practice to control the temperature of the eggs by placing the eggs in racks in specially designed chambers and circulating air of a given temperature throughout the rack. It is of vital importance that the air circulate freely about all of the eggs in the rack since, unless there is free air circulation, the eggs near the center of the rack will tend to remain at a higher temperature than those at the periphery of the rack. Many racks and trays have been designed for the purpose of accomplishing the desired result. Most of the trays, however, are constructed of sheet material or similar material which tends to obstruct the free flow of air throughout the racks and about the eggs. It is, accordingly, an object of this invention to provide an egg tray which may be stacked in an egg rack and which will permit free air circulation about all the eggs in the rack.

It has additionally been discovered that through a process of free selection and carefully controlled incubation including the rotation of the eggs through 180 degrees a significantly higher percentage of viable poults can be produced than with previously used methods. It is accordingly, an object of the present invention to provide an egg tray which may be used in a rack for supporting an egg during 180 degrees of rotation.

SUMMARY

The egg tray of the present invention may be described, and without intending to limit the scope of the invention, as an open work structure made up of a plurality of right angularly intersecting support beams which define rectangular openings in the tray. Each of the rectangular openings is partially closed by a plurality of resilient fingers sticking inwardly, the tips of the fingers being tapered upwardly. Arranged about each of the rectangular openings and extending upwardly and downwardly are a plurality of spiles which are positioned and adapted to engage an egg resting in the rectangular opening and supported by the fingers to limit or prevent the movement of the egg. At the same time, the spiles, the fingers, and the beams of which the tray is made are of a thin resilient material to securely hold the egg while permitting free circulation of air thereabout. Accordingly, the principal object of the present invention is to provide a tray which is constructed and adapted to support eggs in a stacked arrangement and to permit free circulation of air thereabout.

A more specific object of the invention is to provide a tray in which rectangular openings are provided, fingers extend into the rectangular openings for supporting eggs and spiles extend upwardly and downwardly for engaging the eggs and positioning the egg, the rectangular openings and the spiles being so constructed as to permit free circulation of air throughout the trays about the eggs.

The specific construction of the egg tray, having been developed through careful experimentation and design to obtain optimum strength and maximum circulation, also constitutes an important object of the invention.

Other objects of the invention will be apparent from the description and from the drawings to which reference is made.

DESCRIPTION OF THE PREFERRED EMBODIMENT

The present invention contemplates an egg tray which is of open work construction. The frame of the egg tray is formed of a plurality of parallel beams 10, 12, 14, 16, 18 and 20, beams 10 and 12 forming the outer periphery of the frame, and beams 22, 24, 26, 28 and 30, beams 22 and 30 forming the other peripheral members of the beams, the beams 22 through 30 intersecting the beams 10 through 20 at right angles to form rectangular openings in the tray.

Figure 2:
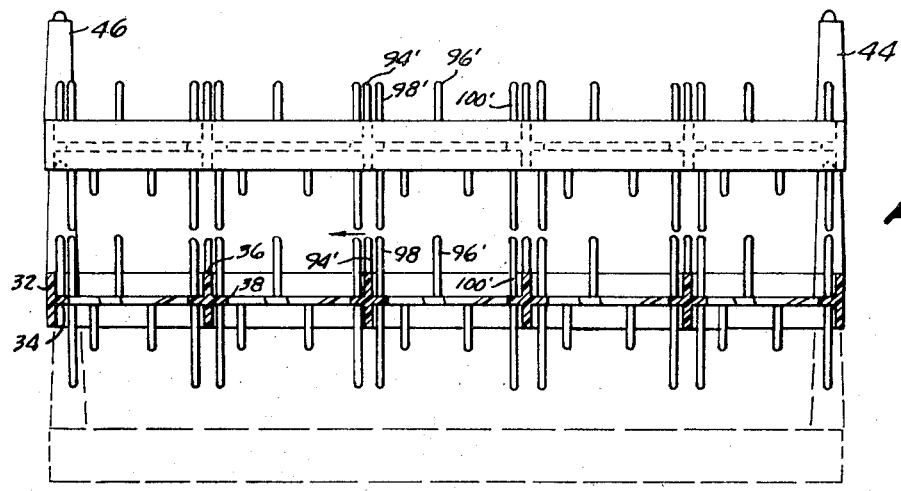
FIGURE 2 is an end view of two of the trays of this invention, one of the trays being shown in cross section taken substantially along lines 2—2 in the direction of the arrows as shown in FIGURE 1.
Figures 5, 6:
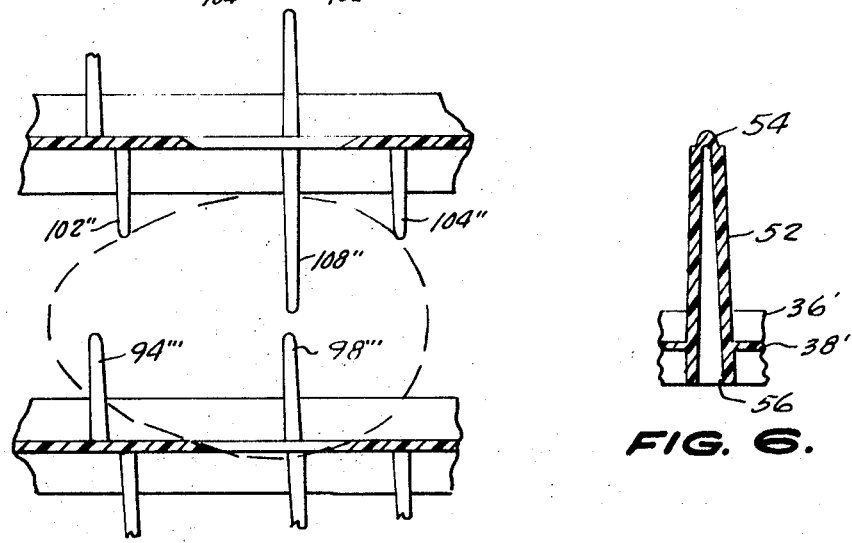
FIGURE 5 is a partial cross-sectional view showing the arrangement of the spiles as they support an egg, shown in dotted line, between two vertically spaced trays.
FIGURE 6 is a detail of a support spile taken substantially along lines 6—6, of FIGURE 2, in the direction of the arrows, the spile being shown in cross section.

As best shown in FIGURE 2, the outer beams 10, 20, 22, and 30 include a vertical support portion 32 and a horizontal lip support portion and reinforcing member 34. Similarly, the interior beams, 12 through 18 and 24 through 28 include a vertical support portion 36 and a horizontal reinforcing lip portion 38 which extends on both sides of the vertical portion 36. It is from the horizontal portions 34 and 38 that the fingers, to be described hereinafter, extend. A plurality of support spiles 40, 42, 44, 46, about the peripheral edge, are secured to and extend upwardly from the frame. One of these spiles is shown in detail in FIGURE 6. As seen in FIGURE 6, each of the spiles constitutes a frustoconical hollow member 52 which has a diminished point 54 on the top thereof and an opening 56 on the bottom thereof. Each of the spiles is held in place by a vertical support member 36' and a horizontal reinforcing member 38', in the case of interior spiles, and analogous portions of the exterior frame members in the case of interior spiles. The diminished point portion 54 is adapted to be received in the opening 56 in the bottom of the frustoconical portion 52 so that a plurality of trays may be stacked one on top of another in a vertically spaced relation, the spacing being determined by the construtcion of the spiles. It may be here pointed out that the spile of FIGURE 6 is approximately to scale, the actual scale being varied depending on the type of eggs to be hatched.

The frame and the tray construction generally is preferably made of cast or extruded polypropylene for reasons which will be discussed hereinafter.

Figure 1:
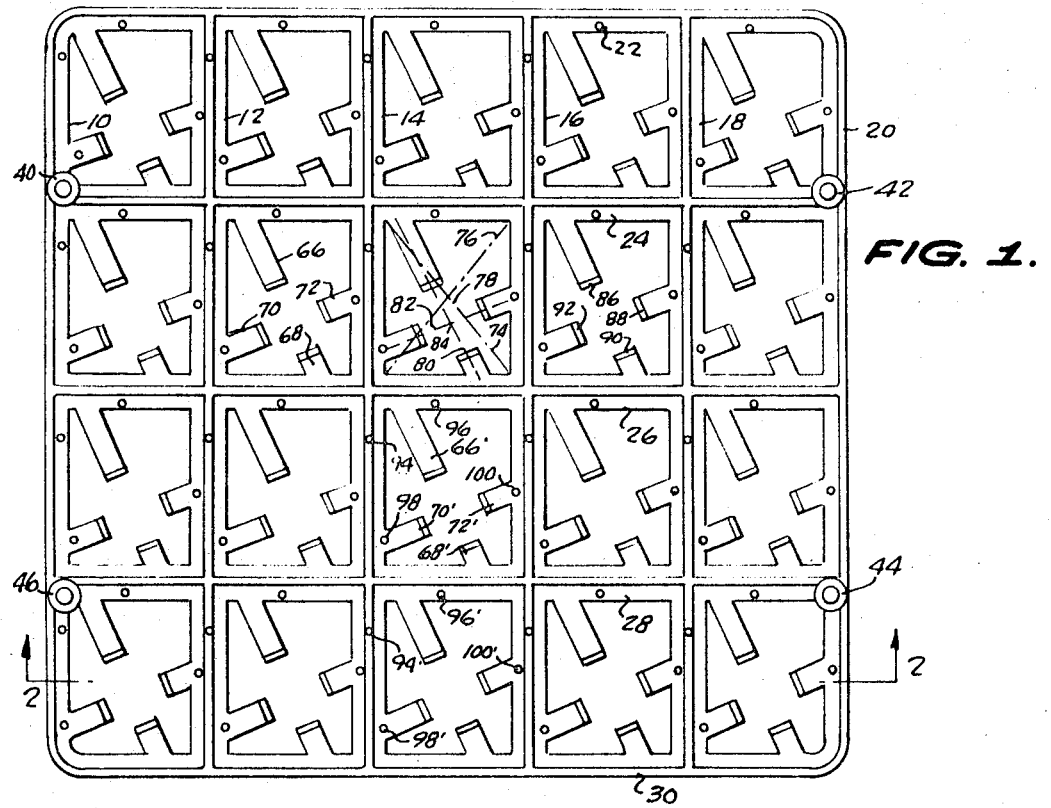
FIGURE 1 is a view of the egg tray of this invention from the top, showing the upper face of the tray.

As viewed in FIGURE 1, each of the rectangular openings formed by the intersecting beams is partially closed by a plurality of fingers extending inwardly, the fingers being formed from the reinforcing lips of the intersecting beams. Thus, for example, fingers 66 and 68 extend inwardly toward each other and, at right angles thereto, fingers 70 and 72 extend inwardly toward each other. The disposition of the fingers may best be described with reference diagonals 74 and 76 of the rectangle which intersect at a point 28. It will be noted that the fingers 66 and 68 would extend along a center line which may be indicated as at 80, while the fingers 70 and 72 extend along a center line indicated at 82. Each of the sets of fingers, of course, extend toward each other in opposed relation. The center lines intersect at a point indicated at 84. The tips of the fingers are beveled or tapered as indicated at 86, 88, 90 and 92 for receiving the egg and nesting the same.

The angle between the center line 80 and the diagonal 74 is approximately 12 degrees while the angle between the center line 82 and the diagonal 76 is approximately 28 degrees. Further, the intersection 84 of the center lines 80 and 82 is approximately $12/19$ of the distance between the edge of the rectangle and the intersection 78 of the diagonals 74 and 76. It will be apparent that the finger 66 is the longer of the four fingers and that the finger 70 is longer than the opposed finger 72. Thus, the egg is nested with its center of gravity approximately on the intersection 84 and is supported by the fingers 66, 68, 70 and 72. The fingers are formed of the same semiresilient, but generally rigid, material as the rest of the tray, namely, polyethylene or a similar material. It is desirable that the tray be generally rigid but that it have some degree of resiliency to accommodate for eggs of different sizes. Further, the tray material should be washable such that it may be cleaned and sterilized, if necessary, between each use.

Extending upwardly from about each of the rectangular openings are a plurality of engaging spiles. A pair of spiles 94 and 96 are disposed on either side of the longer finger 66' while a pair of engaging spiles 98 and 100 extend upwardly from the base of the fingers 70' and 72', that is proximate the point where the fingers 70' and 72' intersect the beams forming the rectangular opening. The engagement of these spiles with an egg will be described in somewhat greater detail hereinafter.

Figure 3:
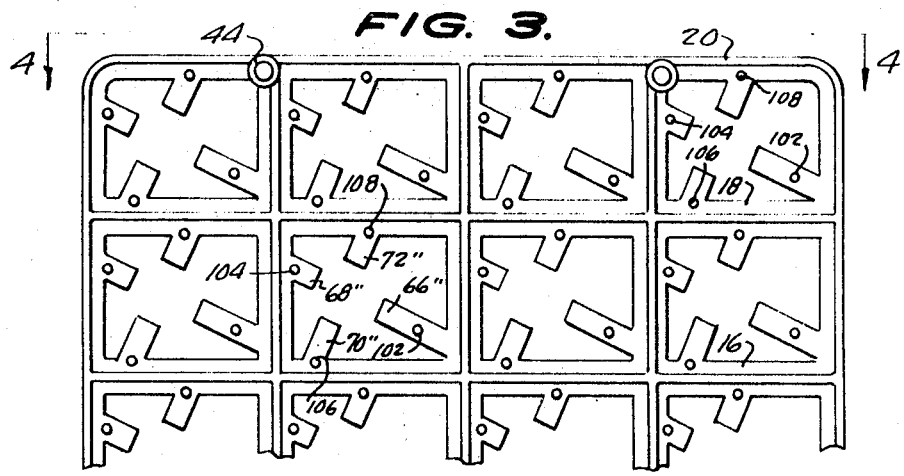
FIGURE 3 is a view of a portion of the tray showing the bottom face thereof, the top edge of the view of FIGURE 3 corresponding to the right edge, as viewed from the bottom, of the tray as shown in FIGURE 1.
Figure 4:
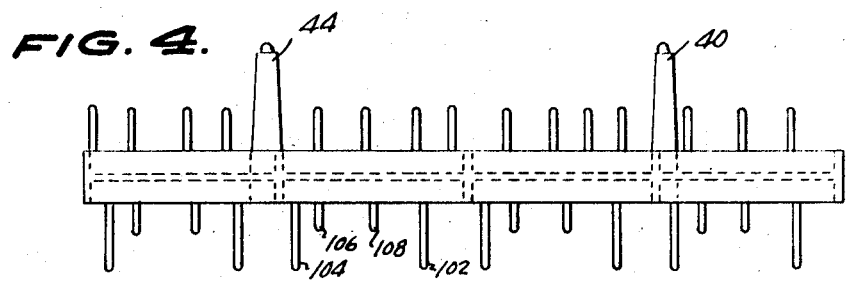
FIGURE 4 is a side elevational view taken substantially along lines 4—4 in the direction of the arrows as shown in FIGURE 3, with the top surface facing upwardly.

Reference is made now to FIGURE 3 which shows the bottom of a portion of a tray. It will be noted that a plurality of spiles extend downwardly from the tray bottom. Spile 102 extends from the longer finger 66 while spiles 104, 106, and 108 extend downwardly from proximate the point of intersection of the respective fingers, 68", 70", and 72" with the beams which form the rectangular openings. The relative disposition of the spiles is shown in FIGURE 4 and in FIGURE 2.

As shown in FIGURE 5, an egg rests in the rectangular opening and is nested by the fingers in the opening such that the center of gravity of the egg is approximately over the intersection of the center lines through the fingers. Since the fingers are partially resilient they permit the egg tray to adapt to eggs of different sizes. Similarly, since the spiles which extend downwardly, 102", 104", 108" and 106", (not shown) are also of a partial resilient material, they will adapt to the different sizes of eggs which are to be used. In a similar manner, the spiles which extend upwardly for engaging the egg, 94''', and spiles 96''' and 100''' (not shown), also engage the egg and are slightly deformable resiliently to adapt to different sizes of eggs. Thus, the egg is engaged on the sides, the top and the bottom, at each end and is supported by fingers all of which are generally rigid but are sufficiently resilient to deform slightly resiliently to adapt to eggs of different sizes. Of course, it may be necessary to provide trays which have slightly varying dimensions for eggs of significantly different sizes, and to provide eggs of a generally uniform size in a given set of trays. Thus, turkey eggs would require trays dimensioned differently than would chicken eggs. However, once the overall configuration and design and construction of the present invention is illustrated, it is simply a matter of scaling the dimensions up or down generally uniformly. It will be seen that since the fingers support the eggs resiliently and there is space for air to flow upwardly and downwardly to the top and bottom of the eggs and since the spiles are of minimum dimensions to permit flow of the air from the sides and the ends of the egg that air will flow in all directions toward and away from the egg. Thus, complete freedom of air flow about each egg individually and about all the eggs in a tray and in a plurality of trays in a rack is provided. Thus, it is possible to keep all of the eggs in an incubator rack at substantially the same temperature and thus provide for a greater percentage of viable poults. Further, since the egg is supported from the top by resilient spiles, as well as from the bottom, it is possible for a rack which includes a plurality of vertically spaced stacked trays including eggs to be rotated and importantly, to be rotated through 180 degrees; the latter process having been found highly efficient in producing very high percentages of viable healthy poults.

In a specific embodiment, the following dimensions have been found highly satisfactory for a turkey egg tray. It will be understood, however, that the dimensions may be varied according to the size of the eggs which are to be hatched and that slight variations in the relative positions and angular relationships may be made without departing from the spirit and scope of the invention. In a desired embodiment, the rectangular openings may be approximately 2.84 inches long and between 2.25 and 2.38 inches in width, as measured from the center of the beams forming the rectangular openings. The intersection of the center lines along which the pairs of fingers extend toward each other may be approximately one inch from the end, longitudinally, of the rectangular opening and approximately 1.1 inches from a side of the rectangular opening. The distance between the end of the longest of the fingers 66 and the respective opposed fingers 68 may be 1.14 inches while the distance between the other pair of fingers 70 and 72 may be .88 inch. As viewed from the top, the distance between spiles 94 and 96 may be 1.2 inches, the spiles being symmetrically disposed with reference to the center line extending through the finger 66 and the distance between the spiles 98 and 100 may be 2.06 inches. The width of the fingers may be .38 inch. The center line extending through fingers 66 and 68 may be disposed at an angle of approximately 65 degrees with respect to the end of the rectangular opening from which the longer of the two fingers extends. In the preferred embodiment, there are twenty rectangular openings but it will be understood that the actual number of openings is not an important limitation in the invention.

It will be understood, also, that additions and variations from the exact structure disclosed may be made without departing from the scope of the invention.

I claim:

1. An egg tray which comprises:
a plurality of support beams intersecting to form a plurality of generally rectangular openings in a desired array surrounded by selected ones of said beams which define the edges of the tray frame formed by said beams;
a plurality of support spiles extending upwardly from the tray frame;
receptacles formed in the bottom of the tray frame, said receptacles being so positioned and constructed as to receive the top of the support spiles on an adjacently positioned tray such that a plurality of said trays may be stacked with the tray frames in spaced relation;
a plurality of fingers extending from the tray frame into each of the rectangular openings; and
a plurality of egg engaging spiles extending upwardly from the tray frame and downwardly therefrom, said additional spiles being so constructed and positioned as to define a space between adjacent rectangular openings in stacked trays for receiving an egg, said fingers and said additional spiles being constructed and spaced engaging the egg to limit movement thereof in said space.

2. The tray of claim 1 wherein the engaging spiles are so arranged that one spile extends downwardly on each side of the egg in the space and on each end of the egg therein said spiles being so arranged as to permit free circulation of air through a plurality of stacked trays.

3. The tray of claim 2 wherein the tray is constructed of a partially resilient substantially rigid plastic material which may be easily cleaned.

4. The tray of claim 2 wherein one of the fingers extending into each opening is longer than the other fingers and wherein one of the downwardly extending spiles is secured to said longer finger.

5. The tray of claim 1 wherein the support beams on opposite sides of the tray frame are formed to define at least one guide opening, said guide opening being asymmetrically positioned such that the guide openings in adjacent trays are aligned only when each of said trays is properly positioned with the top up.

6. The egg tray of claim 1 wherein the fingers comprise:
a first pair of opposed inwardly extending fingers, one of said fingers being approximately three times as long as the other finger, said fingers extending toward each other along a first center line, said first center line lying at an angle of about 12 degrees relative to a first diagonal line of the rectangular opening; and
a second pair of opposed inwardly extending fingers of approximately equal length, said fingers extending toward each other along a second center line, said second center line lying at an angle of about 28 degrees relative to a second diagonal line of the rectangular opening, said center lines intersecting approximately $12/19$ of the distance from an end of the rectangle to the intersection of the diagonal lines of the triangle.

7. The egg tray of claim 6 wherein:
one spile extends downwardly from each of the first pair of fingers;
one spile extends downwardly from adjacent the intersection of each of the second pair of fingers with the tray frame;
one spile extends upwardly from adjacent the intersection of each of the second pair of fingers with the tray frame; and
a pair of spiles extend upwardly from the tray frame on opposite sides of the longer of the first pair of fingers;
said frame and said spiles being so disposed and constructed as to permit free circulation of air around eggs in a matrix formed of a plurality of stacked trays.

References Cited

UNITED STATES PATENTS

| 3,003,463 | 10/1961 | DeRijcke | 119—43 |
| 3,147,738 | 9/1964 | Theilig | 119—43 |
| 3,360,150 | 12/1967 | Schechter | 217—26.5 |

HUGH R. CHAMBLEE, Primary Examiner

U.S. Cl. X.R.
217—26.5; 220—23.6, 97